E. G. MINNEMEYER.
WASHING MACHINE.
No. 11,320. Reissued Apr. 4, 1893.
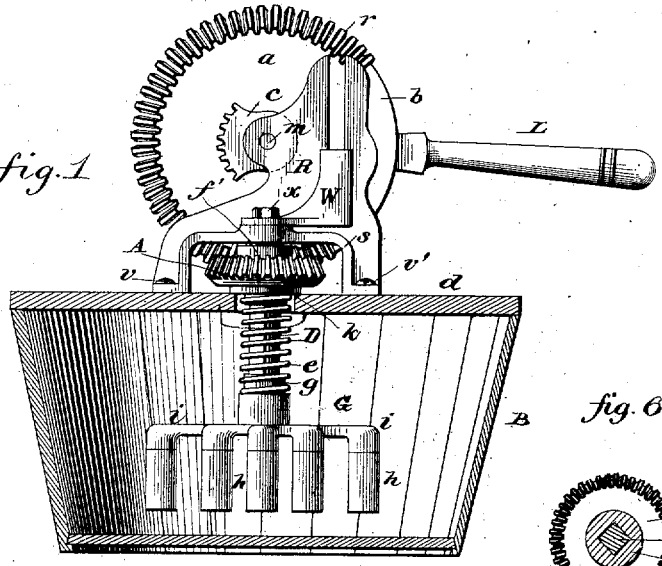
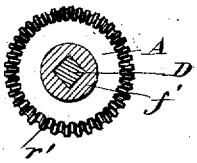
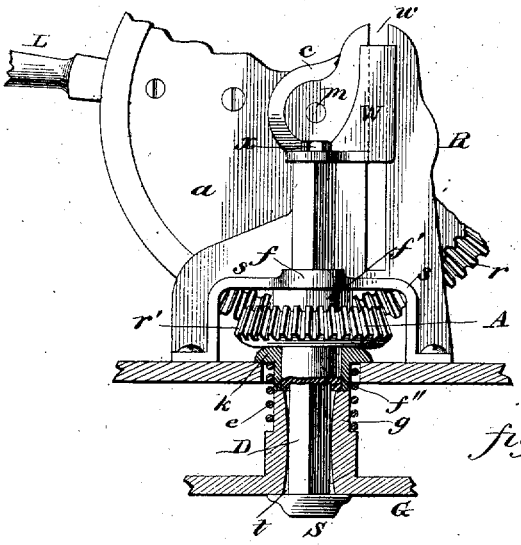
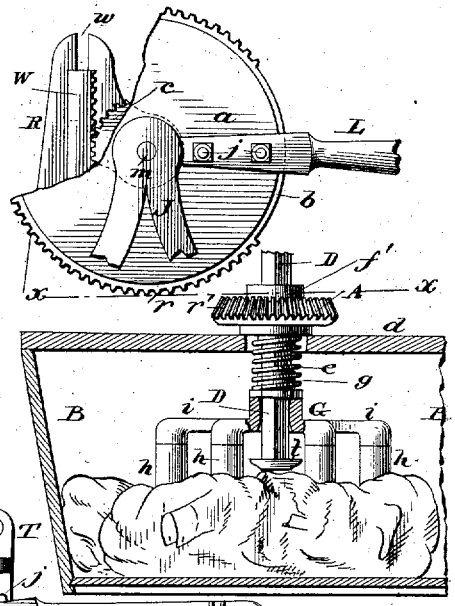
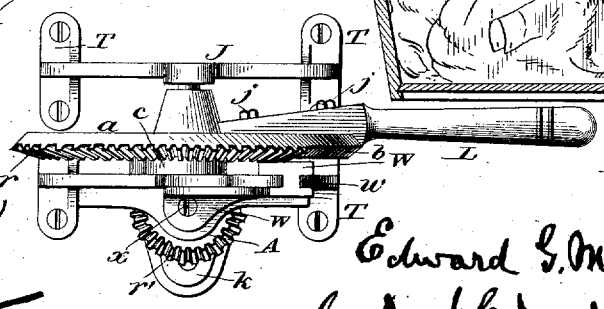
Witnesses;
J. F. Coleman
M. B. May
Inventor
Edward G. Minnemeyer
by Doubleday & Bliss
Attys

UNITED STATES PATENT OFFICE.

EDWARD G. MINNEMEYER, OF PEORIA, ILLINOIS.

WASHING-MACHINE.

SPECIFICATION forming part of Reissued Letters Patent No. 11,320, dated April 4, 1893.

Original No. 456,222, dated July 21, 1891. Application for reissue filed August 30, 1892. Serial No. 444,589.

*To all whom it may concern:*

Be it known that I, EDWARD G. MINNEMEYER, of Peoria, in the county of Peoria and State of Illinois, have invented certain new and useful Improvements in Washing-Machines; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to that class of washing-machines provided with a stirring device having a rotary motion and operated by suitable mechanism in connection with a tub or vessel to which the mechanism is applied; and the object of my invention is to provide suitable mechanism for raising or lowering automatically the stirring device, as more fully described below. This object I accomplish by means of the mechanism illustrated in the accompanying drawings, in which—

Figure 1 shows a side elevation of a washing-machine constructed in accordance with my invention. Fig. 2 is a detail view of the device used in raising and depressing the stirring device. Fig. 3 is a reverse side elevation showing the raising device with a portion of a beveled cog-wheel broken away. Fig. 4 is a detail view of a portion of my invention, as viewed from the top. Fig. 5 is a vertical section of the tub and the parts therein or adjacent thereto, and illustrating the actions of the rubber and its carrier in respect to the contents of the tub. Fig. 6 is a cross section on the line *x*, *x*, of Fig. 5.

Similar letters refer to similar parts throughout the several views.

B represents the tub or vessel to which the machine is applied.

G represents the stirring device provided with the radiating arms *i i* and having the depending fingers *h h h h*, which said stirring device is intended to reach near to the bottom of the tub and may, if desired, be constructed so as to rest upon the tub's bottom.

D is a square bar depending through a square perforation or opening in the collar portion of the stirrer G, and having a head or stop on its lower end by means of which the stirrer is retained on the carrier bar, and by which it is intermittently raised with the carrier when in its lowest position thereon. The said bar D, bearing upward, is carried in a square opening in the beveled cog-wheel A and surrounded at its upper extremity, so as to be carried through a perforation in the flange S of the framework R, and is finally journaled in a perforation in an extension of the plate W and secured in position by means of a screw or nut X, thus forming the support for the stirrer G, said bar D passing through the opening in the stirrer, so as to allow said stirrer to be raised and lowered.

*a* is a cog-wheel which engages with and operates the pinion A. The cog-wheel *a* is provided with the handle or lever L for the purpose of imparting rotary reciprocating motion.

R is a framework which supports the cog-wheel *a*, as at *m*, and also forms both a support and a guide for the plate W.

The plate W, connected with the bar D, as described, is designed to have a vertical motion for the purpose of raising and lowering the stirrer G. The said plate W is grooved at its vertical middle portion to fit in a slot in the framework R and bears the plate of cogs on the inner side of the framework, as shown in Fig. 3, which said plate of cogs is designed to mesh with the segmental cog-wheel *c*, the same being fixed rigidly upon the cog-wheel *a* and journaled with the same, as at *m*.

By reference to Fig. 3 it will be seen that, because of the segmental cog-wheel *c* being rigidly attached to and journaled with the cog-wheel *a* and meshing with the plate of cogs on the plate W, by depressing the lever L the cog-wheel *a* and the segmental cog-wheel *c* are operated, imparting an upward movement to the plate of cogs W through the slot in the framework R, and as the plate of cogs is a part of the plate W, which is connected with the bar D, as before described, and as seen in Fig. 1 and also in Fig. 2, this operation lifts the stirrer G from the clothes and throws the plate W into position, as shown in Fig. 2, when the stirrer comes down it presses upon the clothes in a place different from the one at which it left them before being raised. By means of this construction I am enabled more fully to remove the dirt from the clothes and to grasp them between the stirrer and the bottom of the tub in different places.

*e* represents the coiled spring surrounding the bar D and a portion of the collar G of the stirrer, and bears upon a shoulder provided on the said collar G, and is adapted to press the stirrer downward in order to hold it in contact with the clothes to be operated upon.

By reference to Fig. 2, in which a cut section of the collar of the stirrer G is shown it will be seen that the opening in which the bar D is carried is made to flare slightly outward at its extremities to permit a rocking motion of the stirrer to accommodate itself to avoid obstructions, which, if rigidly fixed would result in damage to the stirrer. It will also be seen that the stirrer is permitted to move up and down on the bar D. I have found by experiment that this construction of the segmental cog-wheel *c*, rigidly attached to the cog-wheel *a*, the plate W, with its plate of cogs which mesh with the segmental cog-wheel *c*, and the connecting parts allow for the automatic raising and lowering of the stirrer and the parts there attached without friction and is very effective for the purpose for which such parts are designed.

The particular advantage in the use of my improved washing-machine is in its simplicity and the cheapness with which it may be constructed, and, further, that the automatic raising is perfectly smooth in its operation and unaccompanied with sudden jars, friction, or draft, since the raising is accomplished by the cog-wheel *c*, which, being small and journaled on the same shaft as the cog-wheel *a*, answers as the short arm of the lever and is a vast improvement over a pin or lug on the outer rim of a reciprocating wheel, purposed to engage by sudden contact with connecting means for raising a stirrer or rubber block and requires less power.

I am aware that there are others who have invented devices for lifting the stirrer or rubber block from the clothes; but I do not know of any such device which combines the same elements of construction as herein described.

It will be seen that in the present construction the difficulties met with in using the earlier machines of this class are overcome. In one sort of earlier machines the horizontal rotation was imparted to the rubber or stirrer by means of arms or fingers projecting downward into the tub, and fixed vertically relatively to the horizontal bevel wheel, the stirrer or rubber being adapted to slide up and down on the said arms or fingers. The latter being fixed vertically always project into and engage with the clothes, so that there is always more or less of a load upon them to be rotated. In the present construction the agitator or rubber rises and falls upon parts which are also vertically movable, and which are so constructed and arranged that they shall never be loaded with the contents of the tub except as they are through the fingers *h* of the rubber. As a consequence, all of the movable parts can be disengaged from the clothing when the carrier bar B is elevated. That is to say the rubber or agitator can be lifted and then turned so as to drop into another position relatively, and engage with the clothes at other points, the latter being without positive rotary movement during such elevating and dropping. This unloading of the rotation-causing part is a matter of saving in the machine, as the tendency to breakage of the supporting parts is much greater in those constructions in which the load is continuously upon the fingers or arms and is therefore being frequently stopped and started in opposite directions around the center.

There are no parts left projecting inward, at the times referred to, and therefore there is but little liability for the clothes to be torn as there is in the machines of this general class having the parts above referred to.

What I claim is—

1. In a washing machine of the class described, the combination of a vertically placed segmental gear having fixed thereto a small segmental plate of cogs fixed near to and journaled upon the same journal, with a vertically adjustable stirrer or rub block provided with a square central opening flared at either end to permit of a rocking motion in the collar of the said rub block, a square bar carried through the collar and carrying a pinion wheel and connecting with a plate of cogs carried in a vertical slot in a framework, the pinion wheel meshing with the segmental gear and the plate of cogs on the segmental gear meshing with the plate of cogs carried in the vertical slot in the framework, and a suitable spiral spring carried around the square bar and between the rub block, all substantially as described and set forth.

2. In a washing machine of the class named, the combination of the segmental cog wheel *c*, fixed upon and journaled with the cog wheel *a*, meshing with the plate of cogs on the plate W, the same working in a slot in the standard or frame R and connecting with the stirrer by means of the square bar B all substantially as described and set forth.

3. In a washing machine of the character described, the combination of the rubber which rotates intermittingly in horizontal planes and also rises and falls, the carrier which imparts horizontal rotary movement to the rubber and which rises and falls, the power devices, means driven thereby for rotating the rubber, and a two-part lifting mechanism of which one part is connected to said carrier and the other part to the power mechanism, and which parts are intermittingly separated from each other while the mechanism for rotating the rubber is in operation, substantially as described.

4. In a washing machine of the character described, the combination of a rubber which intermittingly rises and falls and intermittingly rotates in horizontal planes, a carrier imparting rotary horizontal movements to the rubber and rising and falling relatively to the contents of the tub and intermittingly acting devices for positively lifting said carrier away from the contents of the tub simultaneously with the rising of the rubber, and a spring bearing downward on the rubber and bearing upward independently of the carrier, substantially as set forth.

5. The combination of the horizontal gear wheel A, the carrier bar D sliding through but engaging with said wheel, the stirrer G sliding upon and rotating with the carrier bar, the stop *t*; the spring *e* bearing downward on the stirrer, means for intermittingly lifting the carrier bar, and means for intermittingly rotating the wheel A in opposite directions, substantially as set forth.

In testimony whereof I affix my signature in presence of two witnesses.

EDWARD G. MINNEMEYER.

Witnesses:

JAMES A. HUTCHINSON,
ELWOOD A. ROFF.